(12) United States Patent
Sommer (10) Patent No.: US 8,307,402 B2
(45) Date of Patent: Nov. 6, 2012

(54) METHOD AND APPARATUS FOR MERGING VOICE AND DATA FEATURES WITH INTERNET PROTOCOL TELEVISION

(75) Inventor: Joseph Sommer, Rutherford, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 718 days.

(21) Appl. No.: 12/017,568

(22) Filed: Jan. 22, 2008

(65) Prior Publication Data

US 2009/0187956 A1 Jul. 23, 2009

(51) Int. Cl.
*H04N 7/173* (2011.01)
(52) U.S. Cl. ........ 725/106; 725/110; 725/122; 725/137; 725/141; 725/34; 379/93.23; 379/142.16; 379/88.13; 379/102.03
(58) Field of Classification Search .................. None
See application file for complete search history.

(56) References Cited

U.S. PATENT DOCUMENTS

| | | | |
|---|---|---|---|
| 6,486,892 B1* | 11/2002 | Stern | 715/760 |
| 6,678,362 B2* | 1/2004 | Hong et al. | 379/102.03 |
| 7,293,279 B1 | 11/2007 | Asmussen | |
| 2002/0012353 A1* | 1/2002 | Gerszberg et al. | 370/419 |
| 2003/0142802 A1 | 7/2003 | Hong et al. | |
| 2003/0190024 A1* | 10/2003 | Ju | 379/142.16 |
| 2004/0177378 A1 | 9/2004 | Cool | |
| 2004/0235520 A1* | 11/2004 | Cadiz et al. | 455/557 |
| 2005/0278767 A1* | 12/2005 | Ahluwalia | 725/109 |
| 2006/0031904 A1* | 2/2006 | Groff et al. | 725/106 |
| 2006/0098792 A1* | 5/2006 | Frank et al. | 379/70 |
| 2007/0140150 A1 | 6/2007 | Beck | |
| 2007/0165611 A1* | 7/2007 | Yang et al. | 370/356 |
| 2007/0250845 A1* | 10/2007 | Walter et al. | 725/10 |
| 2007/0265031 A1 | 11/2007 | Koizumi et al. | |
| 2008/0141302 A1* | 6/2008 | Ota | 725/34 |
| 2008/0155628 A1* | 6/2008 | Soukup et al. | 725/110 |
| 2009/0028307 A1* | 1/2009 | Kister et al. | 379/93.03 |

OTHER PUBLICATIONS

International Search Report and Written Opinion for PCT/US2009/031137, Mar. 31, 2009, consists of 10 unnumbered pages.
Weldon, "IMS and IPTV, Perfect Together", Internet Citation, [Online] XP002418650, Retrieved from the Internet: URL:http://ipcommunications.tmcnet.com/hot-topics/ims/articles/280-ims-iptv-perfect-together.htm> [retrieved on Feb. 6, 2007].
Ensor, J R et al., "Blending IPTV Services", International World Wide Web Conference, XX, XX, May 23, 2006, p. 6pp, XP007902765 ISBN: 978-1-59593-051-4.

* cited by examiner

*Primary Examiner* — Dominic D Saltarelli
*Assistant Examiner* — Jason J Chung

(57) ABSTRACT

A method and apparatus that enable the use of a multi-service endpoint device to integrate features and functions of voice and/or data services with IPTV service through a TV console are disclosed. For example, the method connects a multi-service endpoint device (MSED) to a plurality of networks, where at least one of the plurality of networks provides a voice service, and where at least one of the plurality of networks provides an Internet Protocol Television (IPTV) service. The method then integrates the voice service with the IPTV service using the MSED.

14 Claims, 5 Drawing Sheets

FIG. 5

METHOD AND APPARATUS FOR MERGING VOICE AND DATA FEATURES WITH INTERNET PROTOCOL TELEVISION

The present invention relates generally to communication networks and, more particularly, to a method and apparatus for merging voice and data service features with Internet Protocol Television (IPTV) services.

BACKGROUND OF THE INVENTION

When an Internet Protocol Television (IPTV) subscriber receives an incoming phone call while watching TV, the subscriber either has to pause the movie or mute the show to answer the call. By answering the phone call, the subscriber's TV experience is interrupted. The call received by the subscriber may be associated with one of the many types of telephone services subscribed by the subscriber, e.g., a cellular telephone service, a Public Switched Telephone Network (PSTN) telephone service, and/or a Voice over Internet Protocol (VoIP) telephone service. Similarly, the subscriber may receive short text messages (SMS) on a mobile phone or instant messages (IM) on a computer while watching TV, where again the subscriber will be interrupted in order to attend to these received messages.

SUMMARY OF THE INVENTION

In one embodiment, the present invention provides a method and apparatus that enable the use of a multi-service endpoint device to integrate features and functions of voice and/or data services with IPTV service through a TV console. For example, the method connects a multi-service endpoint device (MSED) to a plurality of networks, where at least one of the plurality of networks provides a voice service, and where at least one of the plurality of networks provides an Internet Protocol Television (IPTV) service. The method then integrates the voice service with the IPTV service using the MSED.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, when an Internet Protocol Television (IPTV) subscriber receives an incoming phone call while watching TV, the subscriber either has to pause the movie or mute the show to answer the call. The call received by the subscriber may be associated with one of the many types of telephone services subscribed by the subscriber, e.g., a cellular telephone service, a Public Switched Telephone Network (PSTN) telephone service, and/or a Voice over Internet Protocol (VoIP) telephone service. Similarly, the subscriber may receive short text messages (SMS) on a mobile phone or instant messages (IM) on a computer while watching TV, where again the subscriber will be interrupted in order to attend to these received messages. Currently, there is no integration between the IPTV service and the various aforementioned telephone and data services.

To address this criticality, the present invention enables the use of a multi-service endpoint device to integrate features and functions of voice and data services with the IPTV service, e.g., through a TV console. In one embodiment, the multi-service endpoint device supports IPTV, VoIP, PSTN, cellular, and internet services in parallel. All these services can be provided by a single service provider or by a plurality of different service providers. A user can exercise control of the different services through the TV console, e.g., via a remote control or a wireless keyboard input device. When an incoming call is received while a TV session is ongoing, the caller identification information is displayed on the TV console and the user is given options on how to handle the incoming call. In addition, when a TV session is ongoing, the user can also access instant messaging (IM) service or mobile text messaging service on the TV console using a remote control or a wireless keyboard input device.

Figure 1:
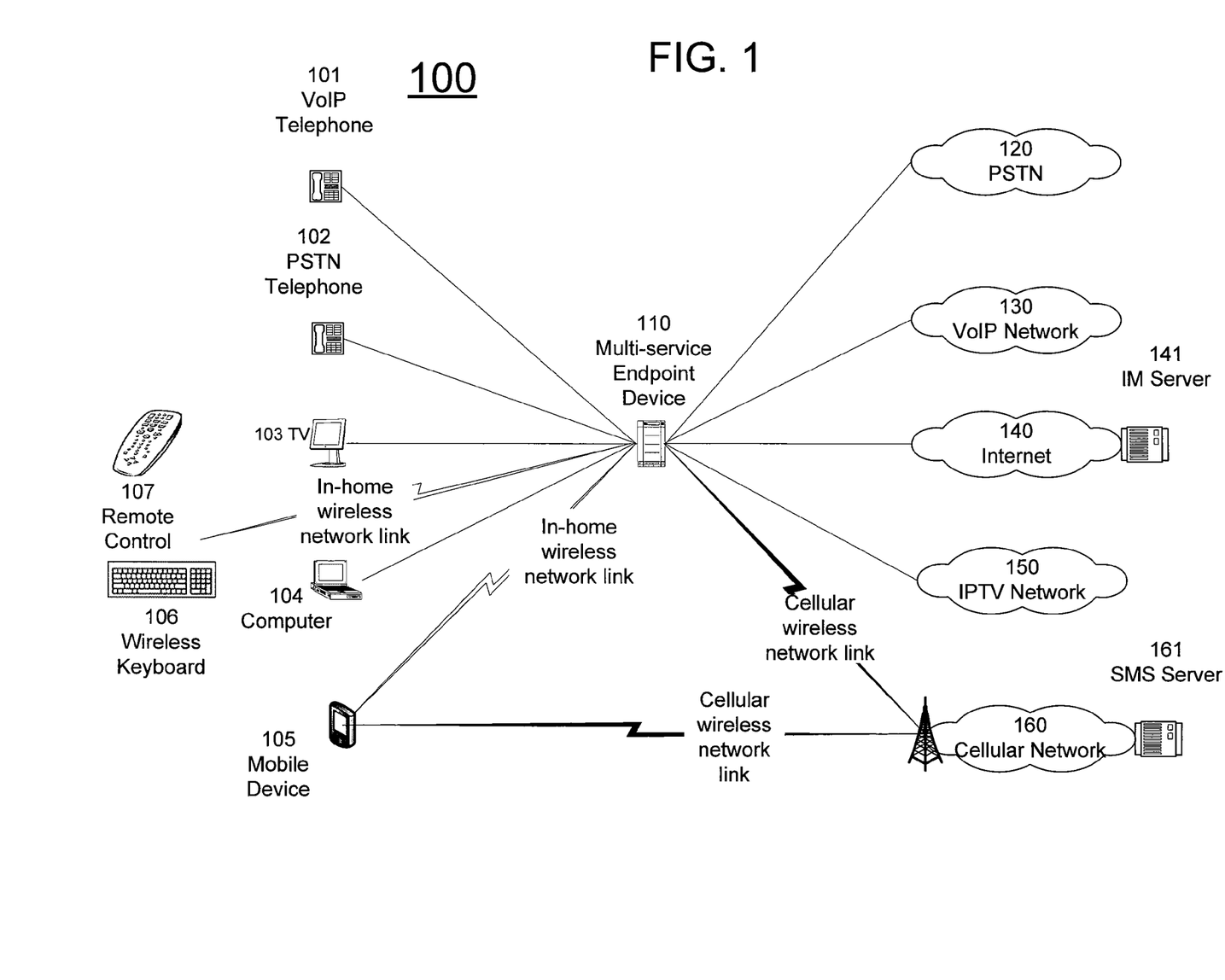
FIG. 1 illustrates a communication architecture having an exemplary multi-service endpoint device connected to multiple service networks related to the present invention.

To better understand the present invention, FIG. 1 illustrates a communication architecture 100 having an exemplary multi-service endpoint device 110 connected to multiple service networks related to the present invention. In FIG. 1, a user subscribes to multiple types of voice, data, and video services. Through the use of multi-service endpoint device (MSED) 110, the user is able to access the different services through a single endpoint device via a TV console. For example, the multi-service endpoint device 110 is connected to a PSTN 120, a VoIP network 130, the Internet 140, an IPTV network 150, and a cellular network 160.

For example, the user may use a PSTN telephone 102 to access PSTN service provided by PSTN 120, a VoIP telephone 101 to access VoIP service provided by VoIP network 130, a computer 104 to access Internet service provided by Internet 140, a TV 103 to access IPTV service provided by IPTV network 150, and a mobile device 105 to access cellular service provided by cellular network 160 all via multi-service endpoint device 110. In addition, mobile device 105 may also access cellular network 160 directly without going through multi-service endpoint device 110. These multiple network services may be provided by a single service provider or by a plurality of different service providers.

In one embodiment, when the user is watching a TV programming on TV 103, an incoming call is received from VoIP network 130. Since the user is already watching TV 103, MSED 110 automatically displays the caller identification on the screen of TV 103 indicating an incoming call from the particular calling party, in addition to ringing the VoIP telephone 101 simultaneously. Through the use of a remote control 107 or a wireless keyboard 106, the user can choose between different answering options in handling the incoming call. In one embodiment, the remote control 107 and wireless keyboard 106 may each have a microphone and/or one or more speakers for voice communication purposes. For example, the user can simply answer the incoming call by selecting the answer option shown on the screen TV 103 and speak to the caller via the microphone embedded within the remote control or the wireless keyboard that is in communication with the MSED 110. In one embodiment, when the call is answered, TV 103 will automatically mute or lower the volume of the currently watched video programming to allow the user to conduct voice conversation with the caller. This automated muting or volume lowering capability can be implemented directly in the TV 103, or it can be implemented in the MSED 110 which, in turn, provides control signals to the volume control of the TV 103.

In one embodiment, the user can choose to answer the call with a pre-recorded announcement which will inform the caller that the user is currently watching a TV programming so that the caller knows that the user is being interrupted when the call is answered. The user also has the option to answer the call by reading the text content using the close captioning capability on TV 103 for words spoken by the caller through the use of voice to text translation. The user can also deny the incoming call by selecting that option on screen and the incoming call will be forwarded to a voice mail system. Similarly, the stored voicemail message received by the voice mail system can be displayed as text content using the close captioning capability on TV 103 for words spoken by the caller through the use of voice to text translation.

In another embodiment, an incoming call from the PSTN 120 can be handled similarly as an incoming call from the VoIP network 130 by the user using remote control 107 or wireless keyboard 106. Again, the TV 103 will provide a visual display of the incoming call information and the available options that the user may select.

In another embodiment, an incoming call is destined to a mobile device 105 from the cellular network 160 while the user is watching a video programming on TV 103. The user can configure his cellular service such that all incoming calls to the mobile device 105 be forwarded or simultaneously sent via VoIP network 130 and PSTN 120 to MSED 110 so that incoming calls can be handled as previously described while the user is watching video programming on TV 103.

In another embodiment, an incoming call is destined to the mobile device 105 from the cellular network 160 while the user is watching a video programming on TV103. In this example, the mobile device 105 has dual mode wireless capability supporting both a cellular interface and a Wi-Fi interface. In this case, an incoming call to mobile device 105 can simply be forwarded to MSED 110 via an in-home wireless networking capability so that the incoming call can be handled as previously described by the user. Note that in this scenario, mobile device 105 is acting as a call forwarding element between cellular network 160 and MSED 110. Wi-Fi is a wireless local area network (WLAN) technology based on the Institute of Electrical & Electronics Engineers (IEEE) 802.11 standards.

In another embodiment, the user can subscribe to a cellular service provided by the cellular network 160 directly using MSED 110. An incoming call can be handled by the user as previously described.

In addition to handling incoming voice calls, the user can also place outgoing calls using remote control 107 or wireless keyboard 106. To support this feature, remote control 107 is equipped with a set of dialing keys that can be used to enter called party phone numbers by the user, where the dialed phone number can be displayed on the screen of TV 103.

By combining the functions and features in supporting both incoming calls and outgoing calls using remote control 107 or wireless keyboard 106 together with TV103, the user can also flexibly initiate or participate in conference calls with multiple parties while watching a video programming on TV 103 via MSED 110.

In one embodiment, MSED 110 combined with the use of TV 103 and wireless keyboard 106 can be used to support various text messaging services as well. In one embodiment, while watching video programming on TV 103, the user can initiate or participate in an IM session via IM server 141 connected to the Internet 140.

In another embodiment, while watching a video programming on TV 103, the user can initiate or participate in SMS text messaging via a SMS server 161 connected by the cellular network 160. If the user has subscribed to cellular service for MSED 110, then the user can send and receive SMS text messages via MSED 110 directly using TV103 and wireless keyboard 106. If the user uses mobile device 105 for SMS text messaging, then the mobile device can act as a SMS text message forwarding element between cellular network 160 and MSED 110 so that the user can send and receive SMS text messages via MSED using TV 103 and wireless keyboard 106.

The present invention greatly enhances and enriches the communication environment by merging the use of IPTV functions and features with other voice and data service functions and features. Thus, TV 103 can be made to serve as a central control console where all types of communications can be conducted.

Figure 2:
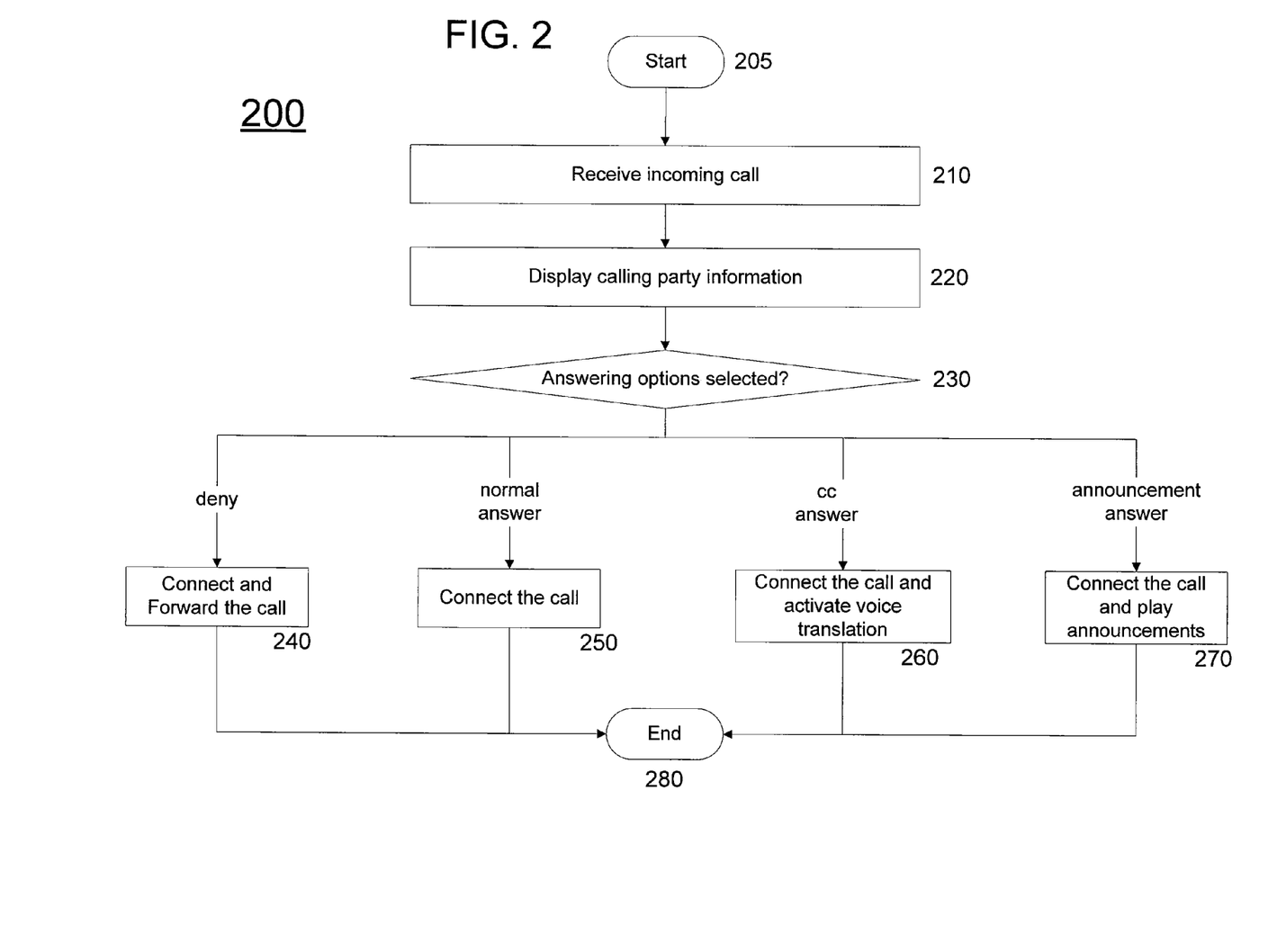
FIG. 2 illustrates a flowchart of a method for handling incoming voice calls of the present invention.

FIG. 2 illustrates a flowchart of a method for handling incoming voice calls of the present invention. Method 200 starts in step 205 and proceeds to step 210. For example, the method 200 can be executed by a MSED.

In step 210, the method receives an incoming call. The incoming call can be received from a PSTN, a VoIP network, a cellular network, or a mobile device via an in-home wireless network.

In step 220, the method displays the calling party identification information on the screen of a TV console connected to a MSED. The calling party identification information may include the calling party phone number and the calling party name. Other calling party identification information, if available, such as email address, URLs, and the like can also be displayed. The method also provides a number of answering options to the user to select. These options may include, but are not limited to: ignoring the call, forwarding the call to a voice mail system, answering the call, presenting an announcement to the calling party and the like.

In step 230, the method determines the answering option selected by the user. If the deny or forwarding option is selected, the method proceeds to step 240. If the normal answer option is selected, the method proceeds to step 250. If the closed caption answer option is selected, the method proceeds to step 260. If the announcement answer option is selected, the method proceeds to step 270. In one embodiment, if the user takes no action, i.e., not selecting any selections, then the default selection is deemed to be the deny option.

In step 240, the method connects and forwards the call to a voice mail system for the caller to leave a voice mail message, if a voice mail system is available. If a voice mail system is not available, then the call is simply ignored and allowed to ring until the calling party terminates the call.

In step 250, the method connects the call and allows the caller and the user to speak to each other. In one embodiment, the method also mutes or lowers the volume of the current video programming to allow the conversation to proceed without background interference. In one embodiment, the method may optionally play an announcement message to the caller, e.g., stating that the user is currently watching a video programming and will be interrupted by answering the incoming call, before the call is connected.

In step 260, the method connects the call and provides or activates a voice to text translation of words spoken by the caller to be displayed via closed captioning appearing on the TV screen. The method may or may not mute or lower the volume of the current video programming. It should be noted that the user may also communicate with the caller by typing a response via the keyboard 106, where the text message is then converted via a text to voice translation module to a voice signal that is played to the caller. This embodiment allows the call to be carried out without requiring the user to speak to a microphone. This allows the user to communicate with the caller while simultaneously watching the video programming.

In step 270, the method connects the call and plays an announcement message to the caller. For example, the announcement message can be artificially created by a text to voice translation system, where the user may have typed one or more messages (e.g., "The called party is currently busy, please call back later", or "Please call back after 30 minutes" and so on). Alternatively, the announcement message can be a prerecorded voice message recorded by the user. This embodiment alleviates the user from having to answer the call, but will allow the user to convey an announcement to the caller. The method ends in step 280.

Figure 3:
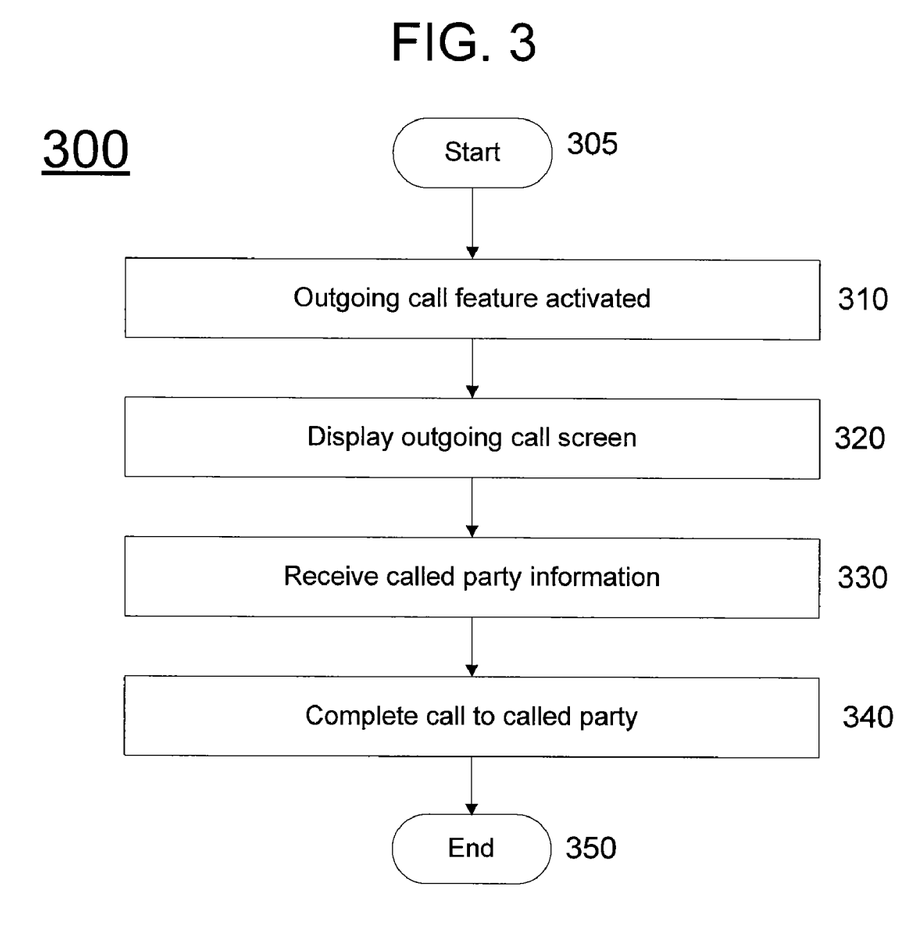
FIG. 3 illustrates a flowchart of a method for handling outgoing voice calls of the present invention.

FIG. 3 illustrates a flowchart of a method for handling outgoing voice calls of the present invention. Method 300 starts in step 305 and proceeds to step 310. For example, the method 300 can be executed by a MSED.

In step 310, the method receives an indication that the user has selected the outgoing call function. For example, the user may have activated a call button on the remote control 107 or keyboard 106 to initiate a call.

In step 320, the method displays an outgoing call feature screen. One or more options or features can be displayed, e.g., a dialing key pad can be displayed on the TV screen for the user to enter the phone number, a phone book having a list of names and associated phone numbers can be displayed, a type of telephony service call to be initiated, e.g., a VoIP call, a PSTN call, a cellular call, and the like.

In step 330, the method receives the called party phone number from the user. For example, the received called party phone number can be entered by the user via a wireless keyboard, a remote control with a set of dialing keys, or point-and-click selection made through the TV screen using the remote control.

In step 340, the method places a call to the called party phone number to complete the outgoing call. The outgoing called is completed using the default telephone network set by the user. However, telephone networks that can be used to place the call include PSTN, VoIP network, and cellular network. Alternatively, the user can select any of the voice networks subscribed by the user to place the outgoing call on a per call basis. The method may also automatically mute or lower the volume of the current video programming to allow the conversation to proceed without background interference. The method ends in step 350.

Figure 4:
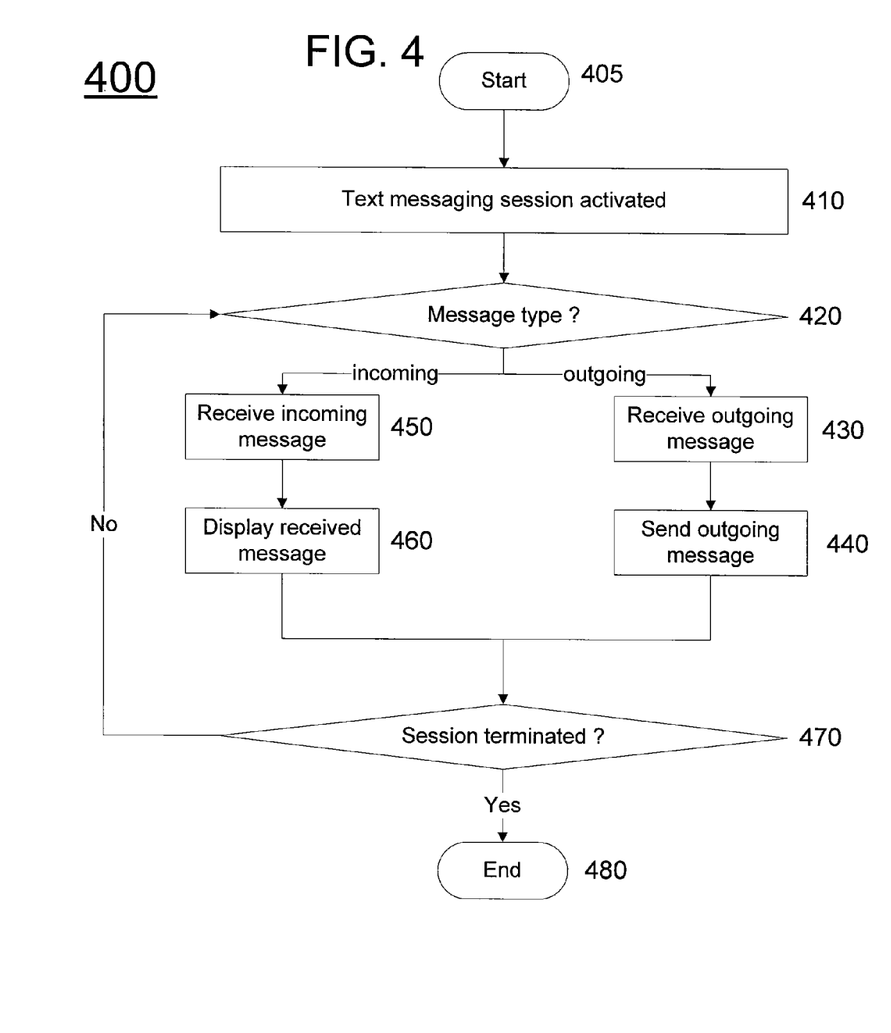
FIG. 4 illustrates a flowchart of a method for handling text messaging of the present invention.

FIG. 4 illustrates a flowchart of a method 400 for handling text messaging of the present invention. Method 400 starts in step 405 and proceeds to step 410. For example, the method 400 can be executed by a MSED.

In step 410, the method received an indication from the user that the user has selected the text messaging function or the method detects an incoming message for the user. For example, the user may have activated a call button on the remote control 107 or keyboard 106 to initiate a messaging service. The text messaging type supported includes both IM and SMS text messaging.

In step 420, the method checks the text message type of the text messaging session. If the text message is an outgoing message, the method proceeds to step 430. If the text message is an incoming message, the method proceeds to step 450.

In step 430, the method receives the content of an outgoing message entered by the user, e.g., destined to a recipient. For example, the content of the message is entered by user using a wireless keyboard or a keyboard image can be displayed on the screen of the TV where the user may use a pointing device to select alphanumeric characters displayed on the screen.

In step 440, the method sends the outgoing text message via the appropriate network. SMS text message is sent via a cellular network to a SMS server and IM text message is sent via the Internet to an IM server. The method then proceeds to step 470.

In step 450, the method receives an incoming message. For example, an incoming SMS text message is received via a cellular network from a SMS server and an incoming IM text message is received via the Internet from an IM server.

In step 460, the method displays the received incoming text message on the TV screen to be read by the user. If a video programming is currently being displayed, the incoming text message can be displayed only on a portion of the screen, e.g., such as in a picture-in-picture implementation. The method proceeds to step 470.

In step 470, the method checks if the text messaging session is terminated by the user. If the text messaging session is terminated by the user or the other party, the method proceeds to step 480; otherwise, the method proceeds back to step 420. The method ends in step 480.

It should be noted that although not specifically specified, one or more steps of methods 200, 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2, 3 and 4 that recite a determining operation or involve a decision, do not necessarily require that both branches of the determining operation be practiced. In other words, one of the branches of the determining operation can be deemed as an optional step.

Figure 5:
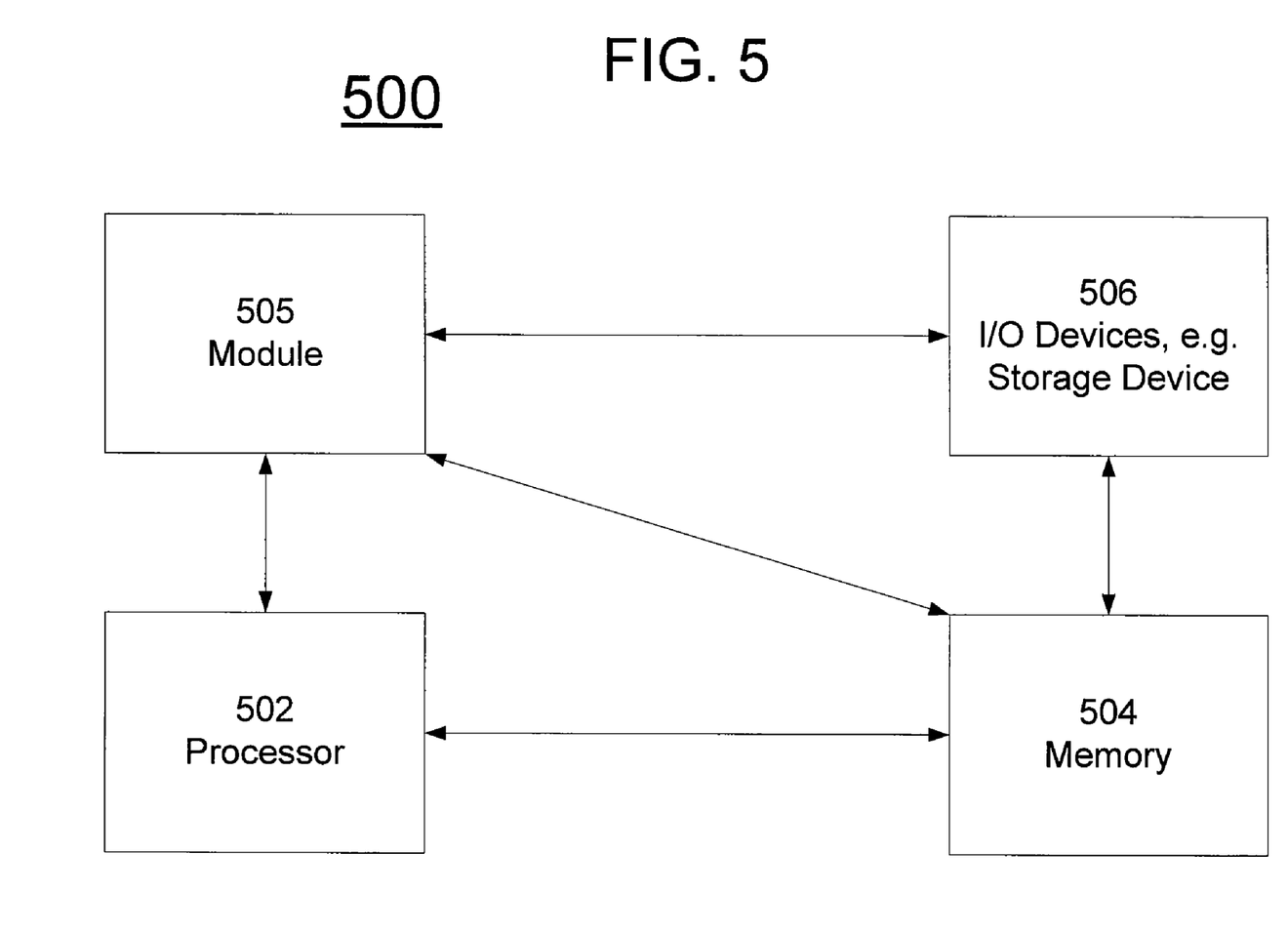
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a merging of voice and data service features with IPTV service module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present merging of voice and data service features with IPTV service module or process 505 can be loaded into memory 504 and executed by processor 502 to implement the functions as discussed above. As such, the present merging of voice and data service features with IPTV service process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a plurality of services, comprising:
   connecting a multi-service endpoint device to a network providing a voice service and a network providing an internet protocol television service; and
   integrating the voice service with the internet protocol television service using the multi-service endpoint device, wherein the multi-service endpoint device is connected to a television console, wherein the integrating the voice service comprises:
      displaying caller information associated with an incoming call on the television console; and
      providing a plurality answering options to be selected by a user, wherein the plurality of answering options comprises:
         a deny option for forwarding the incoming call to a voicemail system;
         an answer option for allowing the user to speak to a caller of the incoming call;
         a closed caption answer option for allowing the user to read spoken words on the television console from the caller using a voice to text translation after connecting the incoming call to the multi-service endpoint device, wherein the voice to text translation is provided by the multi-service endpoint device; and
         an announcement answer option for providing an announcement message to the caller.

2. The method of claim 1, wherein the network providing the voice service comprises a voice over internet protocol network.

3. The method of claim 1, wherein the integrating the voice service further comprises:
   lowering a volume of an ongoing video programming when the incoming call is answered by the user.

4. The method of claim 1, wherein one of the plurality of answering options is selectable by the user via a remote control.

5. The method of claim 1, wherein the integrating the voice service further comprises:
   receiving called party phone number information associated with a called party from the user; and
   initiating an outgoing call to the called party.

6. The method of claim 5, wherein the called party phone number information is received via a remote control device using point and click operations on the television console.

7. The method of claim 5, wherein the integrating the voice service further comprises:
   receiving a type of telephony service to be used for initiating the outgoing call.

8. The method of claim 5, wherein the integrating the voice service further comprises:
   lowering a volume of an ongoing video programming when the outgoing call is placed by the user.

9. The method of claim 5, wherein the called party phone number information is received via a remote control device having a set of dialing keys.

10. The method of claim 5, wherein the called party phone number information is received via a wireless keyboard device.

11. The method of claim 1, wherein one of the plurality of answering options is selectable by the user via a wireless keyboard device.

12. A non-transitory computer-readable medium having stored thereon a plurality of instructions, the plurality of instructions including instructions which, when executed by a processor, cause the processor to perform a method for providing a plurality of services, comprising:
   connecting a multi-service endpoint device to a network providing a voice service and a network providing an internet protocol television service; and
   integrating the voice service with the internet protocol service using the multi-service endpoint device, wherein the multi-service endpoint device is connected to a television console, wherein the integrating the voice service comprises:
      displaying caller information associated with an incoming call on the television console; and
      providing a plurality answering options to be selected by a user, wherein the plurality of answering options comprises:
         a deny option for forwarding the incoming call to a voicemail system;
         an answer option for allowing the user to speak to a caller of the incoming call;
         a closed caption answer option for allowing the user to read spoken words on the television console from the caller using a voice to text translation after connecting the incoming call to the multi-service endpoint device, wherein the voice to text translation is provided by the multi-service endpoint device; and
         an announcement answer option for providing an announcement message to the caller.

13. The non-transitory computer-readable medium of claim 12, wherein the network providing a voice service comprises a voice over internet protocol network.

14. A multi-service endpoint device for providing a plurality of services, comprising:
   a processor; and
   a computer-readable medium in communication with the processor, the computer-readable medium having stored thereon a plurality of instructions, the plurality of instructions including instructions which, when executed by the processor, cause the processor to perform a method comprising:
      connecting to a network providing a voice service and a network providing an Internet protocol television service; and
      integrating the voice service with the internet protocol television service, wherein the multi-service endpoint device is connected to a television console, by:
         displaying caller information associated with an incoming call on the television console; and
         providing a plurality answering options to be selected by a user, wherein the plurality of answering options comprises:
            a deny option for forwarding the incoming call to a voicemail system;
            an answer option for allowing the user to speak to a caller of the incoming call;
            a closed caption answer option for allowing the user to read spoken words on the television console from the caller using a voice to text translation after connecting the incoming call to the multi-service endpoint device, wherein the voice to text translation is provided by the multi-service endpoint device; and an announcement answer option for providing an announcement message to the caller.

* * * * *